United States Patent [19]
Van Lydegraf

[11] Patent Number: 6,011,940
[45] Date of Patent: Jan. 4, 2000

[54] METHOD AND APPARATUS FOR CONVENIENCE COPY COLLATION DURING A CURRENT PRINT JOB

[75] Inventor: Curt Van Lydegraf, Boise, Id.

[73] Assignee: Hewlett-Packard Co., Palo Alto, Calif.

[21] Appl. No.: 09/160,918

[22] Filed: Sep. 25, 1998

[51] Int. Cl.⁷ .................................................. G03G 15/00
[52] U.S. Cl. .......................................... 399/87; 399/405
[58] Field of Search .............................. 399/87, 403, 405, 399/82, 85; 271/298, 303, 304, 305; 358/300

[56] References Cited

U.S. PATENT DOCUMENTS

| | | | |
|---|---|---|---|
| 4,273,439 | 6/1981 | Markham et al. | 355/14 |
| 4,344,697 | 8/1982 | Matsumoto et al. | 355/14 C |
| 4,563,706 | 1/1986 | Nagashima | 358/280 |
| 4,673,990 | 6/1987 | Okada | 358/296 |
| 4,945,390 | 7/1990 | Hasegawa et al. | 399/405 |
| 4,947,345 | 8/1990 | Paradise et al. | 364/519 |
| 5,164,842 | 11/1992 | Gauronski et al. | 358/401 |
| 5,201,518 | 4/1993 | Isoda | 271/305 |
| 5,206,735 | 4/1993 | Gauronski et al. | 358/296 |
| 5,234,213 | 8/1993 | Chen | 271/303 |
| 5,237,381 | 8/1993 | Hamada | 399/406 |
| 5,359,425 | 10/1994 | Maehara et al. | 358/300 |
| 5,361,134 | 11/1994 | Hu et al. | 358/296 |
| 5,553,528 | 9/1996 | Zoltner | 83/443 |
| 5,884,117 | 3/1999 | Tanoue et al. | |

FOREIGN PATENT DOCUMENTS 2-039165  2/1990  Japan .

Primary Examiner—Robert Beatty

[57] ABSTRACT

Embodiments of a electrophotographic printer with modular scanner/copier attached are shown and described, each embodiment having a paper exit system for collating convenience copies separate from the printed pages from a host device's job, for example, a computer word-processing job. The exit system includes a first paper path and a second paper path joining at a junction, with a rotating member that operates in the junction to direct the paper to the first path or to the second path, either by contacting and turning the paper or by allowing the paper to proceed unobstructed. Preferably, one of the paths is a generally horizontal path, for allowing printed/copied papers to stack horizontally on a table surface or tray. Preferably, one of the paths is a generally vertical path, for allowing the papers to accumulate in a generally vertical storage slot. The rotating member is controlled by an interrupt/queuing logic system and a mechanical switch that automatically rotates the rotating member when an interrupting convenience copy is started, so that the convenience copies will travel to the opposite path and housing port from those being used for the current, host's job. Once the interrupting job is done, the logic system automatically switches the rotating member back to its original position. A manual handle may also be used as an override, to move the rotating member to a preferred position, so that the corresponding path and port may be used until an interrupting job is started. The paper exit system is preferably used with a modular scanner that snaps or slides onto the outside of the printer between, and not covering, the printer's two output ports.

2 Claims, 4 Drawing Sheets

METHOD AND APPARATUS FOR CONVENIENCE COPY COLLATION DURING A CURRENT PRINT JOB

FIELD OF THE INVENTION

This invention relates generally to electrophotographic printer paper handling. More specifically, this invention relates to a modular printer plus scanner/copier which has a convenience copy option and automatic switching of printed paper output location. The automatic switching allows for proper separation of the pages produced from the various input sources communicating with the print engine, that is, print jobs from a computer, scanner/convenience copy jobs that interrupt a computer print job, and /or facsimile print jobs.

BACKGROUND OF THE INVENTION

Image-forming systems have been designed to receive input from several devices and to print the images by means of a single print engine. Nagashima (U.S. Pat. No. 4,563,706, issued Jan. 7, 1986) describes a copier system that receives data signals from a laser scanner, from a general purpose computer, and a facsimile, and that stores such data in a plurality of memories. The Nagashima system manages the release of the stored data from one or more of the memories to output means. The Nagashima system prints the "released" data, which may be a facsimile transmission image, a word processing document from the computer, a copy of an original document, etc. by means of a laser photocopy engine. Nagashima discloses a single tray or a single multiple-copy sorter for receiving the output paper, such as is common in a conventional photocopier.

Some photocopiers include an interrupt mode to interrupt a first, large photocopy job for a short convenience photocopy job. The first job's originals are typically stored in a holding bin away from the document viewing glass, while the interrupting job is processed, and then the first job is finished. Markham, et al (U.S. Pat. No. 4,273,439) discloses a copy handling system having at least two parallel banks of copy-receiving equipment, each comprising a sorter and an exit pocket. At least four solenoid-controlled gates direct the first job copies and the interrupt job copies to the four or more possible exit locations, responding to the directions of a logic system monitoring job size and number of copies.

What is still needed is an economical, desktop, multi-purpose printer that features convenience copy collation during a current print job. What is needed is a desktop printer that may print jobs from a variety of input devices, such as a general-purpose personal computer, an add-on scanner/convenience copy device, or a fax, with the resulting copies being directed to separate output locations. A system is needed that allows interruption of a long print job to process a convenience copy job, without mixing the pages produced therefrom.

SUMMARY OF THE INVENTION

The invention comprises a system that receives image data input from a plurality of input sources, including a computer, and a scanner for scanning original documents into the computer CPU and producing convenience copies. The printer system includes a formatter or "logic system" to interrupt a print job in order to perform a convenience copy job. The invented paper exit system manages the output paper direction and destination to conveniently separate the interrupting job copies from the print job papers.

The preferred embodiment comprises a desktop electrophotographic printer with an add-on scanner. The add-on scanner is a unit designed to be stored away separate from the printer, but then snapped into or otherwise connected to an outer surface of the printer to operatively, electronically/electrically connect the scanner to the printer and its logic system. This modular system results in the scanner preferably, but not necessarily, being fully supported by the printer on the front face and top surface of the printer, and the resulting compact, combined scanner-printer unit having only a slightly larger "footprint" that the printer component by itself. The add-on scanner preferably does not obstruct any of the paper exit paths or ports of the printer. The scanner may be used as a means for scanning an original document into a computer, also connected to the print engine and its logic system, for further processing of the scanned image data. Alternatively, the scanner may also be used as a means for convenience copying an original document by scanning it and then printing it out from the printer's print engine.

The invented paper exit system has preferably only two paper exit paths, preferably at an angle of 45–135° to each other. Preferably, the paths are at about 90°, for example, a generally horizontal path and a generally vertical path, which terminate in a horizontal exit port on the front of the printer below the scanner and a vertical exit port on the top of the printer, respectively. Preferably, a single pivoting or rotating bar switches between two positions that direct the exiting paper into one or the other of only two exit paths, resulting in the exit papers either stacked horizontally on a table or tray or "stacked" vertically in a vertical slot. The invented system results in a compact, efficient design that effectively controls convenience copy collation without complex structure.

DETAILED DESCRIPTION OF THE PREFERRED EMBODIMENT

Figure 1:
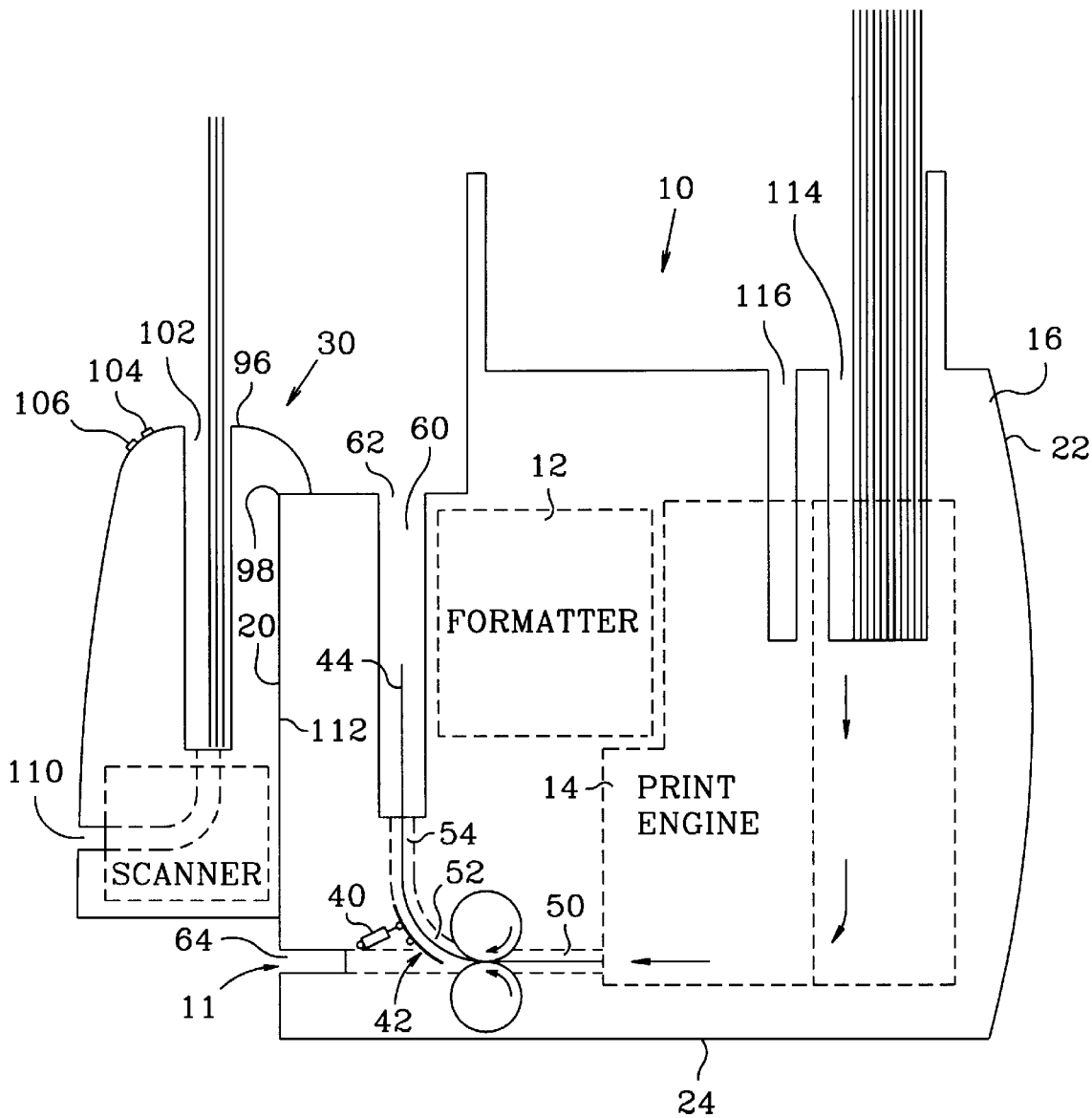
FIG. 1 is a schematic right side view of one embodiment of the invented printer and scanner/copying system, including a convenience copy collating system set in position to direct printed paper to the upper, vertical paper-receiving slot.

Referring to the Figures, there is shown one, but not the only, embodiment of the invented printer 10 with improved paper exit system 11. As illustrated in FIG. 1, the preferred printer 10 includes an electrophotographic (EP) print engine 14 with associated formatter 12. Formatter 12 includes a logic system with firmware and/or software designed to control the printer 10 operation, cooperation with the various input devices, and the queuing for an interrupt mode. The EP print engine 14 may be of various designs known in the EP art. A housing 16 encases the print engine 14 and has a front side 20, back side 22, bottom 24, right side 26 and left side. On one of the sides, preferably the front side 20, may be installed a modular, removable scanner/convenience copier unit 30.

The printer logic system comprises exit system firmware that arbitrates between tasks required of the print engine 14, for example, jobs submitted by a host device such as a personal computer 32 and jobs submitted by the scanner/convenience copier 30. The printer logic system firmware and associated hardware sense when a convenience copy job is desired, for example, because of insertion of original documents 34 into the scanner 30 and push-button "copy" and "number of copies" instructions from the user. The logic system determines the number of pages yet to be printed for the current (first) print job and determines if the first print job should be interrupted for the copy job, based on pre-programmed specifications. If so, the first print job is interrupted and typically only the few pages (2–6) in memory are printed, and then the interrupting copy job is performed. The invented exit system automatically switches the output path to be the opposite of the one being used for the previous print job. This switching comprises a solenoid 40, other bi-stable mechanical switch, or other actuator, for rotating/pivoting bar 42 to an alternative position that directs the exiting paper 44, 44' to the opposite path and, therefore, out the opposite exit port. When the convenience copy job is complete, the logic system resumes printing of the first job and switches the bar 42 back to its previous position to again direct the first print job exit papers 44 to the original outlet port.

The solenoid rotates the bar 42 on command of the logic system, into either an "upward" or "downward" position. In the "upward" position (FIG. 1), so-called because it directs the paper 44 upward, the bar's rear edge 48 actually extends down into the horizontal portion 50 of the exit path at the junction 52 of the vertical branch 54 of the exit path with the horizontal portion 50. The bar 42 thus directs the exiting paper 44 from the horizontal portion 50 of the exit path to turn about 90 degrees to enter the vertical upper output slot 60. The upper output slot 60 communicates with, that is, opens into the top opening 62 in the housing 16, so that printed or copied paper 44 received in/stored in the upper slot 60 may be accessed via the top opening 62. The "downward" position is so-called because it maintains the paper travel down in the horizontal portion 50 of the exit path to exit from the lower, front port 64 or "front opening". In the downward position, the bar 42 is generally horizontal in the junction 52 and above the path of the horizontally-traveling paper 44'.

The upward position of the bar 42 is characterized by the bar being in a generally vertical position with the concave surface 72 of the bar facing rearward. Preferably, the bar is slightly tilted from vertical, with the rear edge 48 at about 0–40° forward of vertical. In this position, the exiting paper 44 moves forward until its forward edge 74 contacts the concave surface 72, whereupon the concave surface bends the moving paper 44 to slide upwards, along the concave surface, and into the upper output slot 60. In the upward position, the bar 42 acts as a scoop to redirect the paper movement, generally, from horizontally forward to vertically upward.

The downward position of the bar 42 (FIG. 2) is characterized by the bar being in generally horizontal position, with the convex surface 73 of the bar facing downward. The bar, and its bushings/bearings or other rotatable mounting means, are positioned so that, when rotated to the downward position, the bar 42 is generally above the horizontal output path of the paper. Thus, the forward-moving paper 44' passes directly below the bar 42 without interference by the bar. The paper may optionally contact and slide along part of the convex surface 73, but, the generally smooth convex surface 73 and the upturned longitudinal edges 48, 74 of the bar in this position do not catch or significantly redirect the paper.

In order to set the initial position of the bar 42, or to manually control the bar position at any time to suit the preferences of the user, the bar 42 also may be rotated into either the upward or downward position by means of a manual switch handle 80 that is accessible from outside the housing 16. By moving the switch handle 80 up and down, the user manually rotates the bar 42 on its axis 82, into the same positions as does the solenoid 40.

Figure 2:
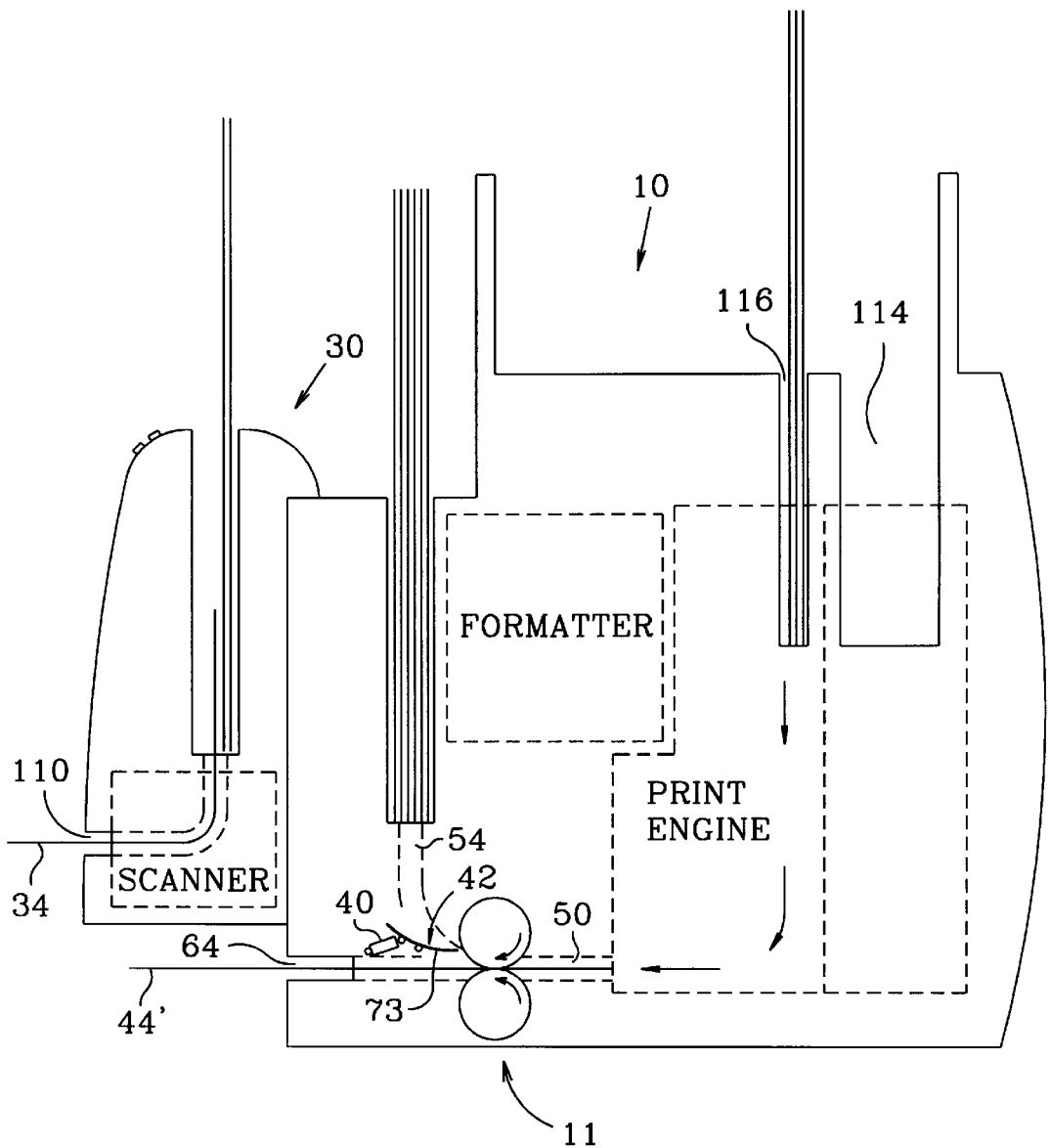
FIG. 2 is a schematic right side view of the embodiment of FIG. 1, with the convenience copy collating system set in position to direct printed paper to the front, horizontal paper output port.
Figure 3:
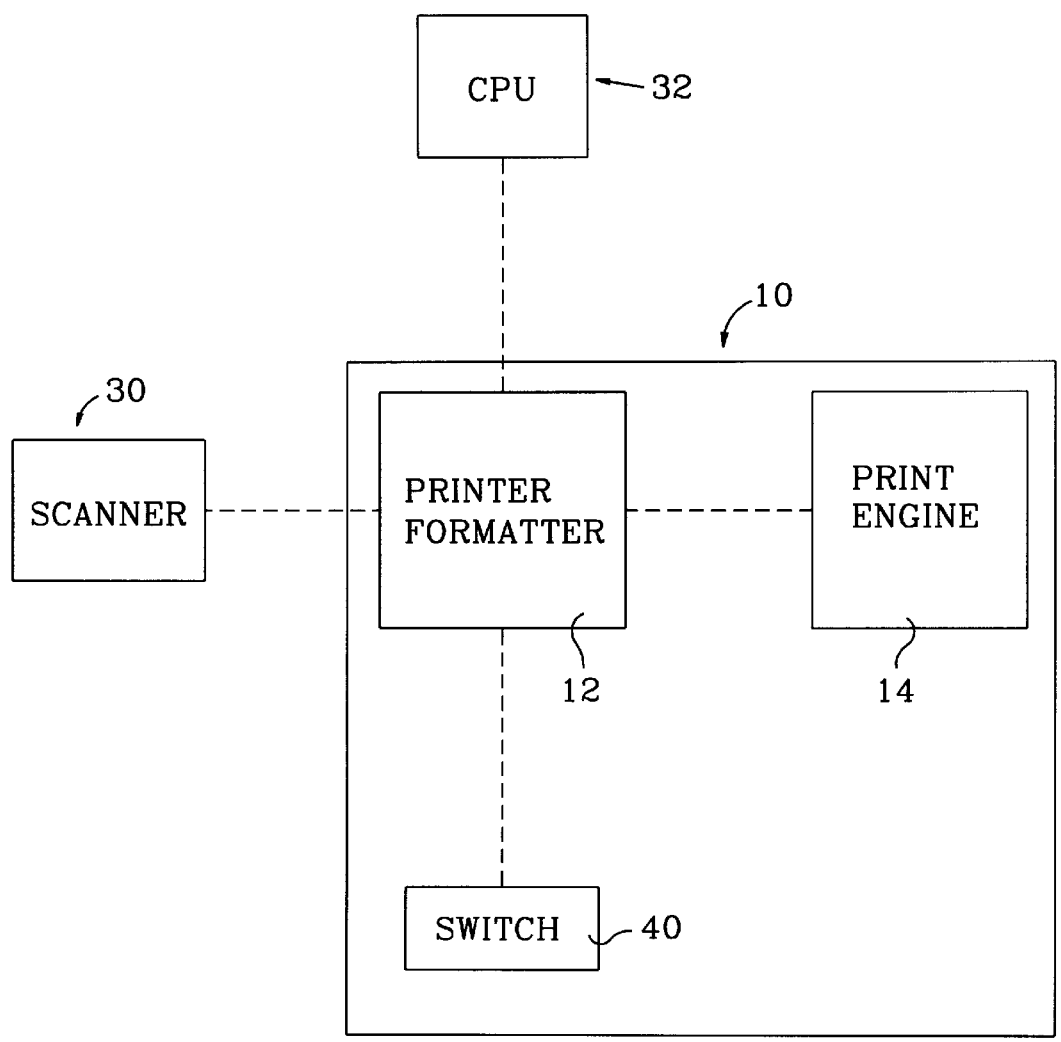
FIG. 3 is a schematic right side view of the embodiment of FIG. 1, illustrating the logic system for communications between the print engine, scanner, computer, and exit path switch mechanism.

Thus, the primary exit path for the user's frequent and large computer print jobs, may be manually chosen by the user by use of the manual switch handle 80. In one example, the user selects the upper output slot 60 as the destination for papers 44 exiting from the "first job", that is, typically his/her computer word-processing jobs. In the example of FIG. 1, the first job papers "stack" up generally vertically and face-backward in the upper slot 60. The upper slot 60 is slightly rearward-leaning and the papers stack up with first-printed pages in back of the subsequent pages, so the upper slot 60 pages are in normal order for reading. Then, when a convenience copy job is run during the middle of a current "first" print job, then the logic system's interrupt mode commences. The remainder of the current print job is stored in memory (printer memory and/or CPU memory), and the solenoid 40 or other switching mechanism rotates the bar 42 to the opposite position from where it has been for the current print job. The interrupting job is printed by the print engine and the exiting paper 44' is directed into the newly-selected exit port, front port 64, as illustrated in FIG. 2. Once the interrupt job is complete, the automatic switching system moves the bar to its original position, the first job is resumed, and the exiting papers again travel to the upper outlet slot 60. Preferably, the bar then stays in the user's preferred position for subsequent, sequential jobs until another interrupting job occurs, at which time the switching system will again operate to swing the bar to separate the interrupting job output papers from previously-printed papers.

In another example, the user prefers to have his/her computer jobs printed out to the front paper port 64, so that the papers stack horizontally and face-up on the table in front of the printer 10 or in a tray in front of the printer. These front-exiting pages stack up in reverse order (first page on bottom), and may stack alternatively with originals exiting the scanner at port 110. The user manually selects this port by moving the switch handle 80 down to place the bar in the downward position, which sends the output horizontally out the front of the printer 10. When the print engine is in the middle of a large print job and an interrupting job occurs, then the logic system stores the remainder of the large print job, and the switching system operates to move the bar automatically to the upward position so that the interrupting job output papers exit the printer 10 at the upper output slot 60. To accomplish the interruption, the logic system may be designed to store the data from the host in the printer memory and proceed with the interrupting job; to stop the data transfer form the host so it remains stored in the CPU memory, print the portion of the print job still in the printer memory, and then process the interruption job; or other processing schemes. When the large print job again begins, the bar is switched to the downward position again and the large print job papers again begin to stack up on top of those previously printed. At any time, the user may manually select a different outlet port from the one being used.

The invented printer 10-scanner/copier 30 unit may also be designed to include facsimile/modem capability. In such cases, facsimile print jobs may also be interrupting jobs that temporarily cause a current job to be held in memory, while the facsimile job is printed. As in the case of interrupting convenience copies, the formatter signals to switch the position of the bar, to redirect the facsimile printout paper to the opposite exit path and port/slot from what was being used for the current job.

Figure 4:
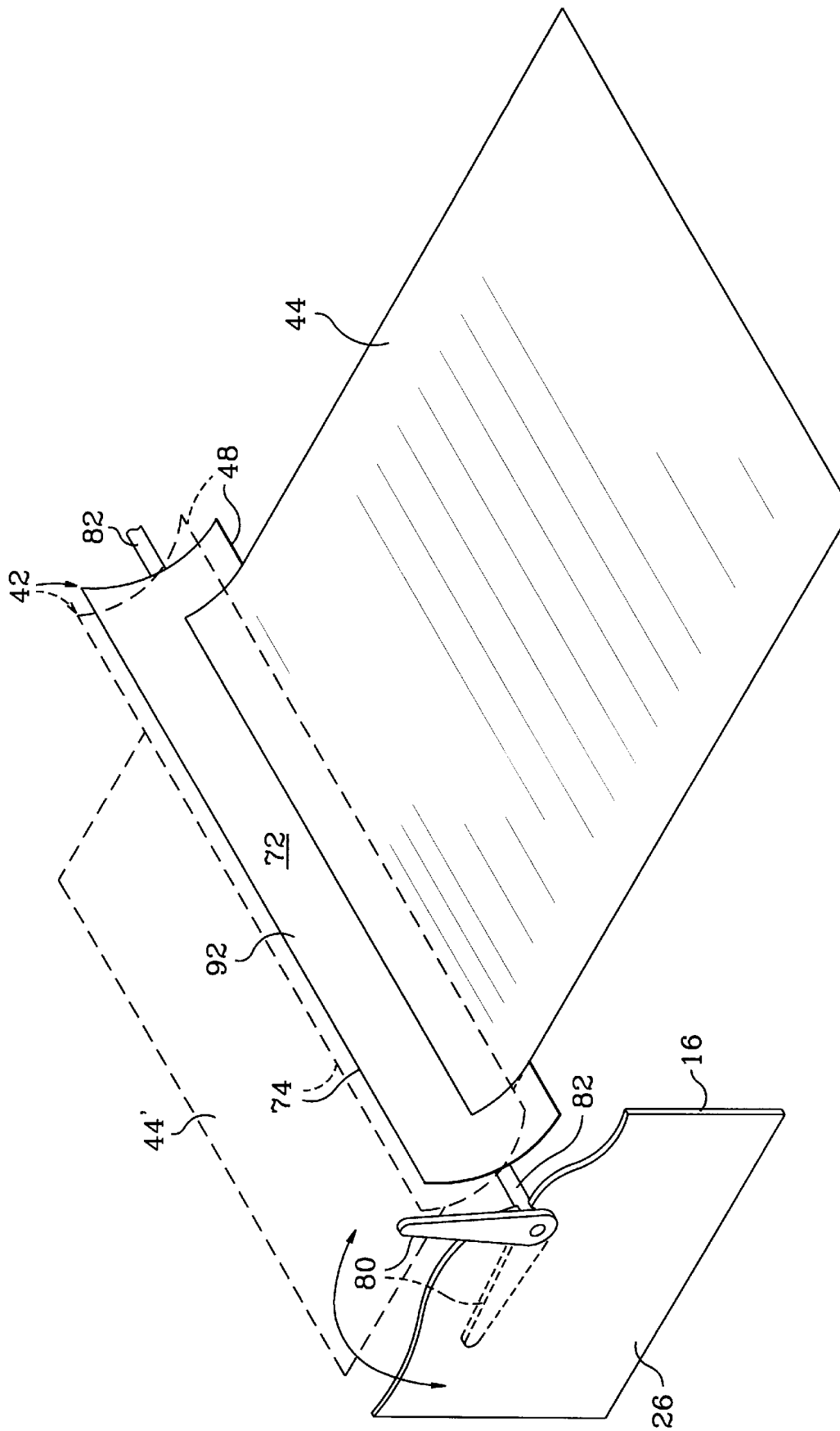
FIG. 4 is a detail view of one embodiment of the switching bar and manual handle of the exit path system.

The preferred bar 42 is an elongated scoop-shaped member that is mounted to rotate inside the printer housing near the exit of the print engine, after the fixing station. The bar 42 may optionally include texture or guides that tend to keep the paper moving straight past or along the bar. The bar is preferably mounted by plastic pins into plastic guides with two mechanically stable positions held in place with a spring. Preferably, the bar's longitudinal rotational axis 82 is located at about the midpoint of the bar, as illustrated in FIG. 4. The solenoid may be connected to the top half 92 of the bar, and the handle 80 may be connected to the axis 82, to rotate the forward edge 48 upwards (clockwise in FIGS. 1 and 2) to place the bar in the upward position described above. The handle 80 may then be moved downward to rotate the forward edge 48 downward (counter-clock-wise in FIGS. 1 and 2) to place the bar in the downward position described above. Thus, the up and down handle 80 movement corresponds to selection of an upper or lower output port, for easy memorization and operation by the user. Alternatively, several other solenoid and handle locations may be used. For example, the bar may be designed to pivot or swing around one of its edges 48,74, in order to move a portion of the bar into and out of the way of the exiting paper. In the claims, the term "rotating" is intended to include both movement around a longitudinal center axis and also any pivoting or swinging of a bar around any longitudinal line of the bar. Also, the bar may be more than one member connected together to direct the paper.

The removable scanner 30 is preferably a compact, generally triangular shape in side profile. The top portion 96 of the scanner preferably hooks over the top, front edge 98 of the printer 10. The scanner top portion 96 comprises the receiving slot 102 for original documents, and a plurality of control buttons or other switches for controlling the scanner operation. For example, one button 104 may start the copy mode, while another button 106 may start the scanning mode for scanning an image from an original into the CPU 32. Originals are placed into the receiving slot 102, fed through the scanner mechanism, and directed out of the scanner original output port 110 at the front of the scanner.

The scanner comprises connection means on its rear surface 112 to electronically/electrically connect to the printer 10, preferably with slide-on or snap-in connection mechanisms. The scanner extends only about half to ⅔ of the way down the front of the printer 10, in order to place the scanner bottom surface above the printer's front output port 64, so as not to obstruct the port.

The front portion of the printer 10 comprises the upper and front output ports, described above, which are generally perpendicular to each other. The upper slot 60 is deep enough to hold and support, along with optional support member 120, the top-exiting printed or copied papers. The front slot 64 is typically not as deep, and allows the exiting papers to fall out of the printer 10 to a table-top or to a tray (not shown) that may be added or set in front of the printer 10.

The rear portion of the printer 10 comprises paper input trays. These trays may comprise a large, print job paper input tray 114 holding about 100–150 pages. Also, these trays may comprise a smaller, approximately 20 page input tray 116 for the convenience copy mode. The printer logic system may be designed to select which input tray is used for a particular job. Preferably, the print engine draws paper from the small tray 116 for "special" computer printing jobs, for example, on letterhead, envelopes, labels, etc. The print engine draws paper from the large tray 114 for ordinary jobs. The printer picks paper from the small tray 116 preferentially, so that tray 116 has priority over large tray 114. This system allows stocking and use of different types/grades/colors of paper for various jobs.

Although this invention has been described above with reference to particular means, materials and embodiments, it is to be understood that the invention is not limited to these disclosed particulars, but extends instead to all equivalents within the scope of the following claims.

What is claimed is:

1. An electrophotographic printer and copying system comprising:

an electrophotographic print engine adapted to print images on paper and move the paper out from the print engine;

a housing enclosing the print engine and having a top surface, a front surface, a rear surface, and a first opening and a second opening;

a paper exit path from the print engine through the housing, the exit path having a first portion adapted to receive the moving paper and ending in the first opening, and the exit path having a branch joining the first portion at a junction and ending at the second opening;

a bar rotatably mounted in the housing in said junction transverse to the exit path and rotatable to a first position and a second position, wherein the bar's first position is generally out of the first portion of the exit path for allowing the paper to travel unobstructed by the bar to the first opening, and wherein the bar in the second position extends into the junction to contact the paper and direct it into the branch to the second opening;

an actuator for moving the bar to the first and second positions;

a scanner attached to the printer, wherein the scanner is electronically connected to the print engine and is adapted to scan an original document;

a manual switch handle connected to the bar and extending out from the housing for access by a user, the handle being adapted to rotate the bar into the first and second positions; and a formatter inside the housing comprising logic adapted to interrupt a print job in response to signals from the scanner, signal the actuator to switch the position of the bar to a position opposite of the position to which the manual switch handle has rotated the bar, and signal the print engine to print out a copy of the original document.

2. A method for collating a plurality of printed papers from a combination electrophotographic printer and scanner unit, the method comprising:

printing, with an electrophotographic print engine, a computer print job comprising a plurality of computer-generated images on printed paper;

manually rotating an elongated bar, by using a manual, hand-actuated switch connected to the bar and extending out of the unit housing, to direct the computer print job printed papers away from the print engine in a first generally horizontal portion of an exit path to a first opening in a printer and scanner unit housing;

inserting original documents into a scanner operatively connected to the print engine and interrupting the computer print job to print copies of the original documents with the print engine;

causing said original documents to exit the unit housing near and generally parallel to the horizontal portion of the exit path of said computer print job printed papers; and automatically rotating the elongated bar, with a solenoid switch responding to signals from the scanner, to direct the copies of the original documents to travel in a second generally vertical branch of the exit path to a second opening in the housing;

automatically rotating the bar with the solenoid, after copying of the original documents and resuming the computer print job, to allow the resumed print job papers to travel into the generally horizontal portion of the exit path to the first opening;

wherein the print job papers accumulate in a tray at the first opening, the original documents accumulate in the tray with the print job papers, and the copies of the original documents accumulate in a generally vertical slot at the second opening.

* * * * *